(12) United States Patent
Liu et al.

(10) Patent No.: US 11,095,933 B2
(45) Date of Patent: Aug. 17, 2021

(54) APPARATUS AND METHOD FOR MONITORING THE PROGRESS OF THE PRESENTATION OF CONTENT

(71) Applicant: ARRIS Enterprises LLC, Suwanee, GA (US)

(72) Inventors: Xiao Liu, Shanghai (CN); Biao Liu, Shanghai (CN)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 15/551,554

(22) PCT Filed: Dec. 30, 2016

(86) PCT No.: PCT/CN2016/113730
§ 371 (c)(1),
(2) Date: Aug. 16, 2017

(87) PCT Pub. No.: WO2018/120119
PCT Pub. Date: Jul. 5, 2018

(65) Prior Publication Data
US 2019/0327515 A1    Oct. 24, 2019

(51) Int. Cl.
*H04N 21/431* (2011.01)
*H04N 5/45* (2011.01)
*H04N 21/422* (2011.01)

(52) U.S. Cl.
CPC .......... *H04N 21/4316* (2013.01); *H04N 5/45* (2013.01); *H04N 21/4221* (2013.01); *H04N 21/4314* (2013.01)

(58) Field of Classification Search
CPC .. H04N 21/4314; H04N 21/4316; H04N 5/45; H04N 21/4221
See application file for complete search history.

(56) References Cited

U.S. PATENT DOCUMENTS 5,818,541 A * 10/1998 Matsuura ................. H04N 5/45
348/565
7,017,173 B1 * 3/2006 Armstrong ....... H04N 21/25883
725/87

(Continued)

FOREIGN PATENT DOCUMENTS

| CN | 1842145 A | 10/2006 |
| CN | 102883222 A | 1/2013 |
| CN | 104244066 A | 12/2014 |

OTHER PUBLICATIONS

PCT International Search Report & Written Opinion, Re: Application No. PCT/CN2016/113730, dated Oct. 11, 2017.

*Primary Examiner* — John W Miller
*Assistant Examiner* — Humam M Satti
(74) *Attorney, Agent, or Firm* — Buchanan, Ingersoll & Rooney, PC

(57) ABSTRACT

The described examples provide for output of first content from a first source of a set top box output terminal for presentation in the full display area of display device. In response to receiving a wait request from a user input device, the outputting of the first content is switching to outputting second content from a second set top box source. While outputting the second content for presentation on the display device, the first content currently being provided by the first source is periodically output for a predetermined duration in a display device portion inset within the full display area that is presenting the second source content. In response to a return input from the user input device, the set top box switches from outputting the second content source to outputting first content currently obtained from the first source.

18 Claims, 6 Drawing Sheets

(56) References Cited

U.S. PATENT DOCUMENTS

| | | | | |
|---|---|---|---|---|
| 8,330,863 B2* | 12/2012 | Kondo | ............... | H04N 21/47 |
| | | | | 348/564 |
| 8,434,124 B2* | 4/2013 | Lynch | ............... | H04N 5/4403 |
| | | | | 725/140 |
| 2005/0001934 A1* | 1/2005 | Hwang | ............ | H04N 21/4316 |
| | | | | 348/569 |
| 2006/0221238 A1* | 10/2006 | Takayama | ......... | H04N 21/4263 |
| | | | | 348/565 |
| 2008/0216124 A1* | 9/2008 | Dekkers | ........... | H04N 21/4316 |
| | | | | 725/59 |
| 2010/0070995 A1* | 3/2010 | Pan | ................. | H04N 21/812 |
| | | | | 725/34 |
| 2010/0201879 A1* | 8/2010 | VanDuyn | ............. | H04N 5/45 |
| | | | | 348/565 |
| 2013/0014140 A1 | 1/2013 | Ye et al. | | |
| 2017/0064396 A1* | 3/2017 | Yun | ................ | H04N 21/4826 |

* cited by examiner

APPARATUS AND METHOD FOR MONITORING THE PROGRESS OF THE PRESENTATION OF CONTENT

TECHNICAL FIELD

The present subject matter relates to techniques and equipment to provide a user with an indication of the progress of the presentation of content provided by a first content source while content from a second source is presented on a display device.

BACKGROUND

Many forms of digital content are provided to people over a myriad of electronic devices. One method of monetizing the presentation of the digital content is to include advertising with the digital content. Presently, some form of advertising is provided with nearly all of the content that people consume on their electronic devices whether it be their mobile devices, such as a smart phone, or their television. Historically, television programming content was interrupted by advertisements, referred to as "commercials." The commercials became an annoyance due to either their duration or their timing for interrupting the program content being presented.

In response to the presentation of commercials on a television, viewers often leave the area in which they were watching the programming content to do other things, such as obtain a snack or a drink, use the restroom, talk with friends or family. Other times, the viewer switches to another content channel to view the content being presented on the other channel, or even switches to another media source, such as a video game console, digital versatile disc, a memory device, an Internet® or cloud-based media service, or the like, that may be coupled to the television.

Often times, in order for the view to return to the programming content, the user has to switch back and forth between channels or sources with the hope of correctly timing the end of the presentation of the advertising content and the presentation of the programming content. Such back-and-forth switching is inconvenient and wastes time for the user.

Another way for coping with the advertising content is for the viewers to time shift the content being presented, such as by pausing the programming content and resuming watching the content later, at which time the advertisements may be skipped using a fast-forward operation However, time shifting is also inconvenient because often times if a viewer pauses the programming content for too long, the pause function may time out and begin playing. In yet another alternative, a viewer may record the content provided by the source and watch at later time. By watching at a later time the viewer is able to skip the commercials. However, in the case of a live event, such as an Olympic soccer match or the like, time shifting is not preferred as the viewer may hear of the outcome of the live event prior to viewing the recorded content.

SUMMARY

The concepts disclosed herein provide for a method that outputs first content received from a first source of a set top box for presentation in a first area of a display device. During the presentation of first content, a user wait request input is received that includes an identification of second content from a second content source to present on the display device. The second content received from the second source is presented in the first display area of the display device in place of the first content. After passage of a preset period of time, the first content currently received from the first source is presented in a second display area of the display device that overlaps less than all of the first display area of the display device for concurrent presentation of the second and first content on the display device. After a predetermined duration of presenting the first content in the second display area, the presentation of the first source content in the second display area is terminated. In response to receiving a subsequent user return request, the first content currently received on the first source is presented in the first display area of the display device.

Another concept that is provided is a system that includes a display device and a set top box. A processor in the set top box presents content received from a first source in a first area of a display device. During presentation of the first content, the processor receives a user wait request input including identification of the second content source. The processor presents content received from the second content source in the first area of the display device in place of the first source content. After passage of a preset period of time, the first content 1 is presented in a second area of the display device. The second area overlaps less than all of the first area of the display device for concurrent presentation of the first content and second content on the display device. At the end of a predetermined duration the processor terminates the presentation of the first content in the second area. In response to receiving a subsequent user input requesting return to the presentation of the first content in the first area of the display, the first content is presented in the first area of the display device.

Yet another concept provides a method that includes steps of outputting from a set top box output terminal first content provided by a first source for presentation over the full display area of display device. A wait request is received from a user input device. In response to the received wait request, outputting of the first content is switched at the set top box to outputting second content from a second source. While outputting second content for presentation on the display device, first content is periodically output for a set duration for presentation in a portion of a full display area of the display device that overlaps less than all of the full display area of the display device. In response to a return input from the user input device, the set top box is switched from outputting of the second content to outputting the first content for presentation over the full display area of display device.

Also provided is a computer readable medium example in which a non-transitory machine-readable medium containing machine-readable programming instructions is provided. The instructions causing a processor to output from a set top box output terminal first content provided by a first source for presentation over the full display area of display device. A wait request is received via a user input device. In response to the received wait request, the outputting of the first content from the first source is switched to outputting second content from a second source. While second content from the second source is output for presentation on the display device, first content is periodically output for a predetermined duration for presentation in a portion of the display device that overlaps less than all of the full display area of the display device. In response to a return input from the user input device, the set top box is switched from outputting the second content to outputting first content for presentation over the full display area of display device.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various examples disclosed herein relate to providing a method and apparatus that enable a user to monitor, or be provided with updates, of the progress of the presentation of content from one source while viewing content provided by another source. Thereby eliminating the inconvenient and time wasting practice of switching back-and-forth between channels or sources in order to view the desired programming content. The method also avoids continuously blocking a portion of the image from the other content source with content from the one source, that is displayed, for example, as a picture-in-picture (PIP) inset image in the image from the other content source, for the duration of an advertisement from the second content source. While the materials below describe switching between programming content and content containing an advertisement, it is contemplated that it may be used more generally to switch between content provided by two content sources.

The term "coupled" as used herein refers to any logical, physical or electrical connection, link or the like by which signals produced by one system element are imparted to another "coupled" element. Unless described otherwise, coupled elements or devices are not necessarily directly connected to one another and may be separated by intermediate components, elements or communication media that may modify, manipulate or carry the signals. Each of the various couplings may be considered a separate communications channel.

Reference now is made in detail to the examples illustrated in the accompanying drawings and discussed below.

Figure 1A:
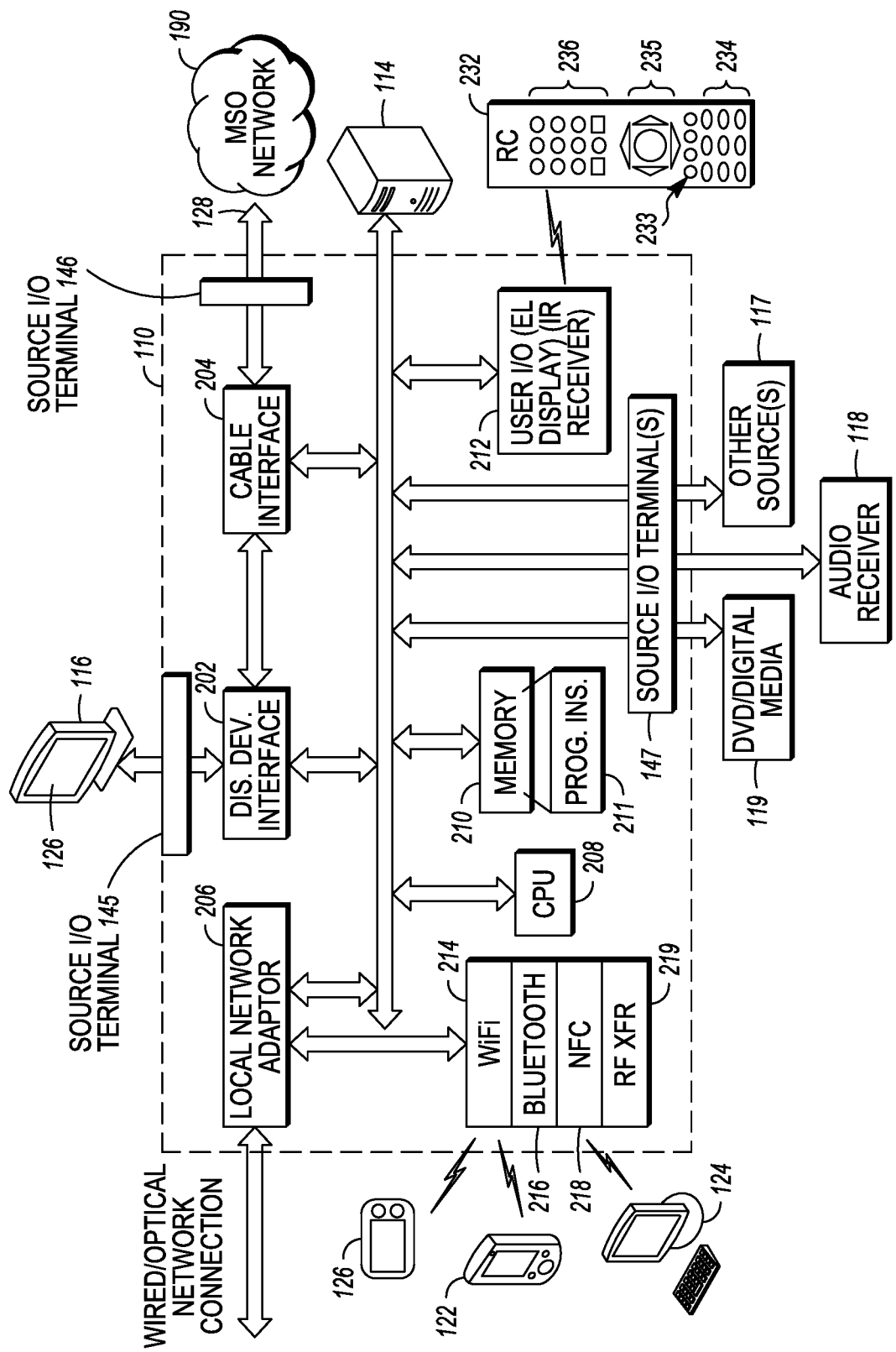
FIG. 1A is a block diagram of an example home network environment.

FIG. 1A shows a block diagram of an example set-top box (STB) 110. The example STB 110 shown in FIG. 1A includes display device interface 202 for processing data, e.g. decoding an MPEG or HEVC video stream to output visual content for display on display device 116 and to stream audio content to display device 116. The display device interface 202 is capable of delivering content from multiple sources to the display device 116 for presentation. The STB 110 also includes an interface for local communication with CPE devices, and in this example, that interface takes the form of a local network adapter 206 which includes a wired/optical communication port as well as wireless ports to WiFi transceiver 214, Bluetooth transceiver 216, NFC transceiver 218 and an RF transceiver (labeled "RF XFR), such as a ZigBee RF4CE transceiver. In this example, WiFi transceiver 214 may be a WiFi access point.

The STB 110 also includes cable interface 204 for receiving programming and Internet protocol (IP) packets from an edge serving office (ESO) 130. An ESO 130 may be a headend or central office of a multiple service provider (MSO) 190, such as a cable, satellite, or telephone company. The IP packets may, for example, include HEVC streams, encapsulated MPEG transport streams, Windows Media streams or other audio/video streaming data. The streaming video data received and processed by the STB 110 is collectively referred to herein as video streams. These streams may include MPEG transport streams from the cable interface 204, IP encapsulated MPEG transport streams from the ESO, HEVC video streams, Windows Media video streams or other streaming video data. The circuitry of the display device interface 202 may include circuitry that decodes selected video streams to send decoded video data to the display device 116. An example display device interface 202 is described below with reference to FIG. 1B.

The MSO 190 may be coupled to a first source, such as source I/O terminal 146, of the STB 110. In instances where the MSO 190 delivers a number of channels of content, such as sports channels, cooking show channels, history-related channels, premium movie channels, public service channels, traditional television network channels and the like, a viewer/user may select to view the different channels via the first source I/O terminal 146 of the STB 110. The cable interface 204 may also send and receive data over the network 190 to/from an EOS-associated server (not shown) and/or a content server (not shown) to obtain the media content and possibly meta-data files or meta-data related instructions from the ESO 130. The STB 110 also includes circuits forming one or more processors to implement a CPU 208 and memory 210 for controlling operations of the STB 110, including executing programming instructions for performing the processing of the IP packets, media content and meta-data files as well as programming related to user interface functions, such as those described with reference to FIG. 2. The example STB 110 is connected to the network attached storage (NAS) device 114 for storing the media content and meta-data files downloaded via the ESO 130. The memory 210 may include one or more memories and/or other program and data storage devices, for example, for storing instructions executable by the CPU 208.

The example STB 110 also includes a user I/O interface 212. The user I/O interface 212 may include an electroluminescent (EL), liquid crystal device (LCD), or light emitting diode (LED) display for displaying information to the user watching the display device 116. The user I/O interface 212 may also include an infrared (IR) receiver for receiving instructions from the user's remote control 232. Although not shown in detail, this IR receiver may be implemented as an IR transceiver and provide a communication channel for sending and receiving short-range optical communications between the STB 110 and one or more of the CPE devices 114, 116, 118, 120, 122, 124, 126 and 232.

In an example of the operation of the STB 110 shown in FIG. 1A, the user of mobile device 122 may transmit, via WiFi access point 214 and local network adaptor 206, a wireless signal, instructing STB 110 to retrieve media content (e.g. a TV show) from a content provider (e.g. a streaming video service or cable television provider) coupled to the ESO 130. In response, the CPU 208 sends a request for this media content to the ESO 130 via cable interface 204 and the cable input line, such as 128. CPU 208 may then receive the requested media content, a meta-data file associated with the media content, and an indicator indicating that the meta-data file should be utilized to facilitate reproduction of the media, from the content provider. The received media content, meta-data file and indicator are then transmitted to the mobile device 122 via local network adaptor 206 and WiFi access point 214. In response to receiving the indicator, the CPU of the smartphone 122 may extract the identifier from the meta-data file to identify and reproduce the media content based on the information in the meta-data file.

Content may be reproduced upon receipt. Alternatively, the content may be stored, either in the memory 216 of the STB 110, in the memory (not shown) of one of the CPE devices, or in the WAP device 214, and reproduced at a later time. By way of an example, at a later point in time, when the user wishes to reproduce the media content stored in memory 216 on the display device 116, the remote control device 232 associated with the STB 110 or display device 116 sends a request for the media content to the STB 110 via the user I/O connection 212. When storing media content, the memory 216 may be considered a source of content. Assuming that the STB 110 has stored the requested media content from a previous download in the WAP device 114 or memory 216, the CPU 208 of the STB 110 retrieves the media content, associated meta-data file and indicator from the WAP device 114 or memory 216, and sends the stored media content, associated meta-data file and indicator via the display device interface 202 and source I/O terminal 145 to the display device 116.

Each of the CPE devices 114, 116, 118, 120, 122, 124 and 126 coupled to the STB 110 uses a predetermined protocol. This protocol may be, for example, IEEE 802.11 WiFi, Universal Plug and Play Device Management (UPnP DM), IEEE 1394 FireWire, IEEE 802.15 (e.g. WPAN, Bluetooth, Bluetooth Low Energy (BLE), ZigBee, ZigBee RF4CE, etc.) or other data exchange protocol. The STB 110 may manage some or all communications between two or more of the CPE devices.

The memory 210 may store machine-readable programming instructions 211 that may be read by the CPU 208. The instructions 211 cause the processor 208 to output from the set top box output terminal 145 advertising content provided by a first source for presentation over the full display area of display device. A wait request is received via a user input device, such as 232. In response to the received wait request, the outputting of the advertising content from the first source, such as content from the MSO network 190, is switched to outputting content received from a second source, such as from digital versatile disc (DVD)/digital media device(s) 119 or gaming device console 117 that may be coupled to an HDMI input terminal or the like of STB 110. While content from the second source, such as from 117 or 119, is output for presentation on the display device 116, content currently being provided by the first source is periodically output for a set duration for presentation in a portion (shown in the example of FIG. 4) of the display device 116 overlapping less than all of the full display area 126 that is presenting the content from the second source. In response to a return input from the user input device 232, the outputting of the content from the second source, such as 117 or 119, is switched to outputting content currently being provided by the first source, such as network 190, for presentation over the full display area 126 of display device 116.

The programming instructions 211 may also include instructions for the CPU 208 to respond to unique inputs received from the wireless remote control device 232. Signals generated in response to the unique inputs to the inputs 233, 234, 235 and 236 of wireless remote control device 232 are transmitted wireless from the remote control device 232 and are received at the STB 110 via the User I/O 212. The received remote control device 232 signals, or a representation thereof (generated by the User I/O 212, for example) are delivered to the CPU 208. Based on the received signals, the CPU 208 performs an action and/or function.

The wireless remote control (RC) 232 may include an infrared (IR) or radio-frequency (RF) (e.g. Bluetooth®) transceiver and electronic circuitry as is known in industry. The example of a wireless remote control device 232 is shown having a number of inputs, such as buttons 233, 234, 235 and 236. For example, the inputs 236 may be alphanumerical buttons, e.g. combination of letters A-Z and numbers 1-10, the inputs 235 may be directional and confirmation (e.g., an OK button) inputs for navigating a menu, such as an electronic program guide (EPG) or a search screen, the inputs 233 may be color-coded specialty inputs that may be user assigned or may assigned particular functions by the MSO provider (not shown). The inputs 234 may be preassigned inputs that operate functions related to the retrieval and playback of content stored in memory 216 or provided by the MSO provider, e.g., an ON-Demand movie rental or the like. For example, the user remote control device 232 includes an input button, such as at least one of buttons 233 configured to generate the wait request or the return request when actuated. Of course, the remote control device 232 may be configured such that any one or a combination of buttons 233, 234, 235 or 236 may generate the wait request or the return request when actuated.

The programming instructions 211 may include user preference information used when the content monitoring service described herein is performed. For example, the user preference information indicate to the CPU 208 that when the user actuates one of the inputs 233, the CPU 208 interprets the input as an initiation of the content monitoring service. Additional information may also be assigned to the particular input 233.

In addition to initiating the content monitoring service, the input, for example, based on the user preference information, may be interpreted by the CPU 208 as indicating that the set top box 110 should switch from presenting content from the first source I/O terminal 146 to presenting content from a device coupled to another source terminal, such as source I/O terminal 145 or 147. The change of source as described above may also be a change of channel from a particular source. For example, as described above the MSO content provider may provide various channels of content, such as channels dedicated to sports, channels dedicated to cooking and so on, and the CPU 208, in addition to interpreting the input 233 as a wait request, may also interpret the input as a change channel instruction, and change the channel to a predetermined channel assigned to the input 233.

When executed the programming instructions 211 may configure the CPU 208 to present a user interface on the display device 116 that accepts inputs from the user remote control 232. Alternatively, any one of devices 122, 124 or 126 may also have application programs compatible with the STB 110 programming instructions that enable user configuration modifications to the user preference information stored in memory 210. The user preference information mentioned above may include wait parameter settings that are specific to the wait request. For example, a user via the user interface provided by the STB 110 on the display device may perform a set-up of the wait request. For example, through the user interface of the set top box 110, a time period and a duration setting for periodically outputting for the set duration content currently being provided by the first source for presentation in the portion of the display device overlapping the part of the full display area that is presenting the content from the second source.

Figure 1B:
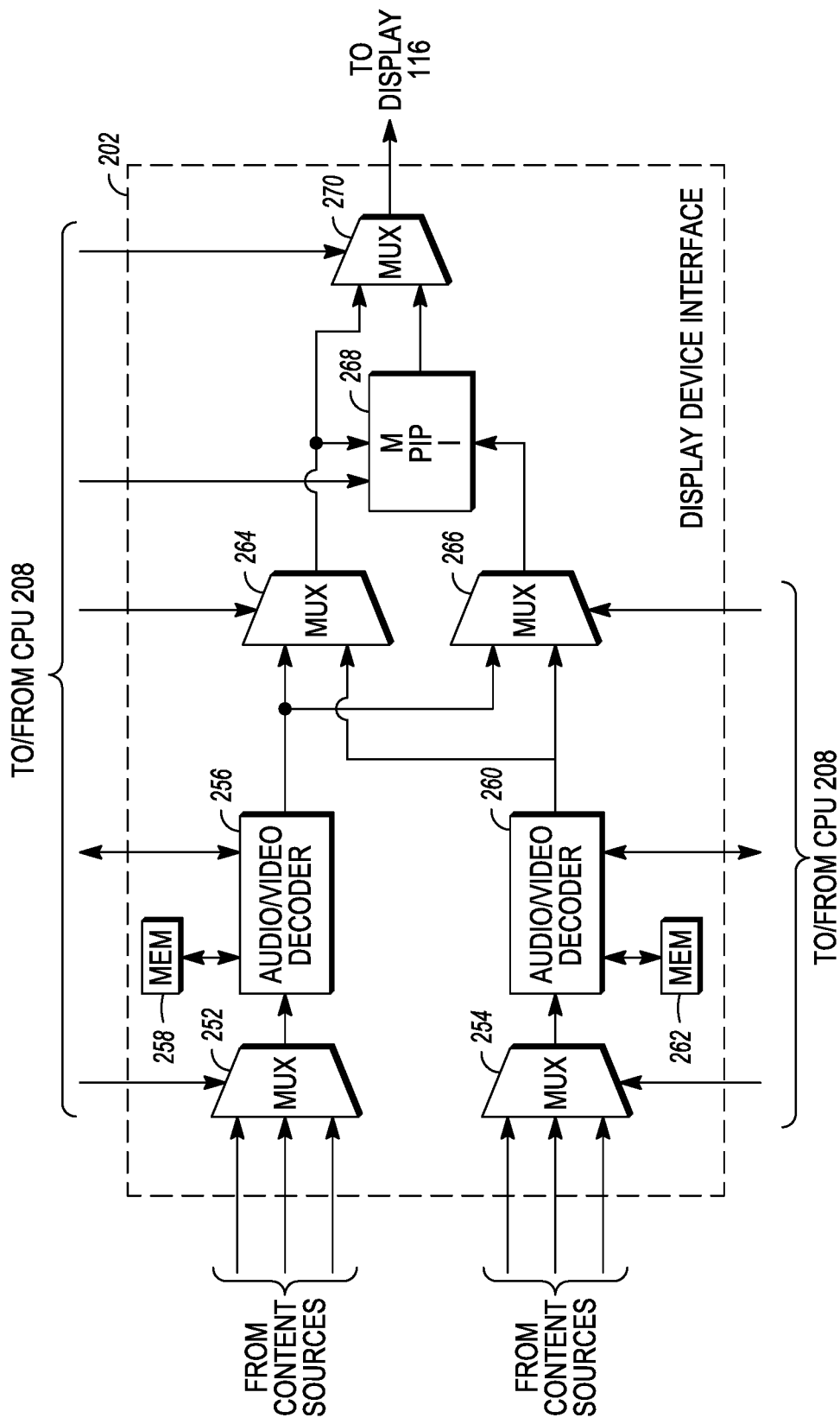
FIG. 1B is a block diagram of an example display device interface of the set-top-box shown in FIG. 1A.

As described above, the STB 110 includes a display device interface 202 that processes received video streams for display on the display device 116. FIG. 1B is a block diagram of an example display device interface 202. The example interface 202 includes two video decoders 256 and 260. Video decoder 256 is coupled to receive a video stream to be decoded from multiplexer 252. Multiplexer 252 is coupled to receive video streams from the various video data sources (e.g. cable interface 204, DVD/Digital Media device 119, local network adapter 206, etc.). The CPU 208, responsive to the signals received from the remote control device 233 controls the multiplexer 252 to select one of these program streams to be decoded by the video decoder 256. Similarly, decoder 260 is coupled to receive a video stream from multiplexer 254 under control of the CPU 208. The video stream may be a single video stream or a multi-program video stream. When the audio/video decoder 256 and/or 260 receives a multi-program stream, the CPU 208 may provide a control signal to the decoder causing it to select one program from the stream for display on the display device 116.

Each decoder 256 and 260 includes a respective memory 258 and 262 which holds data used by the decoder, for example, reference frames, to decode the received video streams. In this example system, each of the video decoders 256 and 260 provides a decoded video signal to each of the multiplexers 264 and 266. Multiplexers 264 and 266 are controlled by the CPU 208 to select one of the video signals to be applied to the main input terminal, M, of the Picture-In-Picture (PIP) processor 268 and the other video signal to be applied to the inset input terminal, I. The PIP processor 268 filters and subsamples the video signal applied to its I input terminal to generate a small image and then substitutes data from the small image into a selected portion of the main image to produce the Picture-In-Picture effect. The CPU 208 controls the PIP processor 268 to select the size and location of the inset image on the main image. In a typical system, a user may use the remote control device 233 to select from a limited number of locations and a limited number of image sizes.

The composite image produced by the PIP processor 268 and the output image provided by the multiplexers 264 are applied to respective inputs of a multiplexer 270. The CPU 208 controls the multiplexer responsive to the wait command to selectively display either the image provided by the multiplexer 264 or the composite image provided by the PIP processor 268. Alternatively, the multiplexer 270 may be eliminated and the CPU 208 may control the PIP processor 268 to selectively insert the image corresponding to the signal from multiplexer 266 into the image corresponding to the signal provided by multiplexer 264. Furthermore, it is contemplated that the multiplexers 264 and 265 may be eliminated if decoder 256 is dedicated to provide the main image and decoder 260 is dedicated to providing the inset image data for the PIP processor 268.

Figure 2:
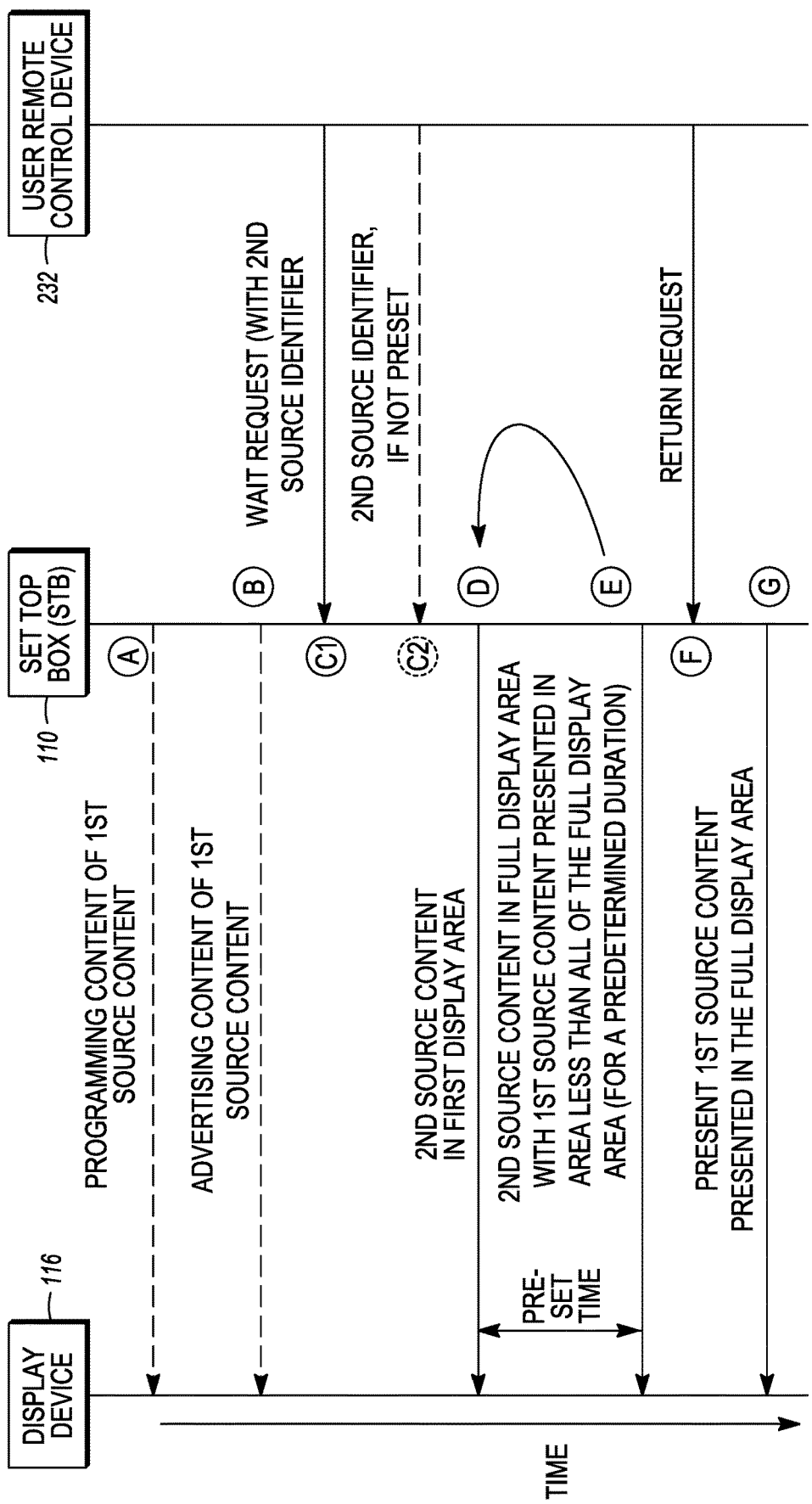
FIG. 2 is a Ping-Pong chart describing an example of the operation of a set top box within the example home network environment of FIG. 1A.

It may be appropriate at this time to further describe the method for providing the source monitoring service with reference to FIG. 2. FIG. 2 illustrates a Ping-Pong chart describing an example of the operation of the set top box within the example home network environment of FIGS. 1A and 1B.

The example of FIG. 2 illustrates interactions between the display device 116, the set top box (STB) 110 and the user remote control device 232. The STB 110, as discussed above is configured to receive content from various content providers, such as the MSO network 190, DVD or digital media devices 119, other source(s) 117, such as gaming consoles, portable memory devices, a satellite communication device, an internet-connected device, and/or the like. At A, the display device interface 202 outputs content, such as a reality television show, received on a first STB source, such as cable input line 128 from MSO Network 190, of a set top box for presentation as the main image, of the display device 116. The first source content (e.g., the reality television show) provided via the first set top box source includes programming content and advertising content that are presented sequentially on the display device. Programming content is the content related to the plot and storyline of the reality show, including the characters, dialogue and related subject matter, while advertising content is the "commercials" that introduce the viewers of the reality television show to various consumer products and services, public service announcements, and the like.

As is well known, the programming content is halted and advertising content is presented in place of the programming content at different times during the presentation of the first source content on the display device as in B of FIG. 2. A viewer may wish to not view the advertising content (in this example, first content), and may wish to either view other content (in this example, second content) provided by the same or different content provider coupled to the first STB source 128, or content provided on another source of the STB 110, such as source 117, DVD 119 or WAP device 114. In such a case, the viewer, during the presentation of advertising, or first content, may use the wireless remote control device 232 to perform an action. For example, the viewer may select an input on the wireless remote control device 232 instructing the STB 110 to perform the content monitoring service described herein.

As mentioned above, the viewer may select one or a combination of the inputs selected from buttons 233, 234, 235 or 236 to instruct the STB 110 to provide the content monitoring service. At C1, the STB 110 receives a user wait request input from the remote control device 232. For example, a user may depress one of the inputs 233 to send the wait request that initiates the content monitoring service. The wait request input may be followed with another input C2. The input C2 may be an input via one or more of the alphanumeric inputs 236, that is an identification of a second content item (e.g. another television channel, digital media 119 or gaming console 117) coupled to the set top box 110 that provides content to the STB 110 for presentation on the display device 116. Alternatively, the wait request input may include a pre-set identification of a user preference channel or source that is stored, for example, in memory 210 as discussed above. In yet another alternative, in response to the wait request, the CPU 208 may cause the presentation of an electronic program guide (EPG) to enable a view to select the content to be presented.

In response to receiving the wait request input (and the second source identifier, if necessary), the STB 110 presents second content received on the second source of the set top box in the first area 126 of the display device 116 in place of the advertising content of first source content (at D). To implement this scheme using the example display device interface 202 shown in FIG. 1A, the CPU may cause the multiplexer 252 to provide the first signal, having the advertising, or first content, to the video decoder 256 and may concurrently cause the multiplexer 254 to provide a second signal from the second source to the video decoder 260. The CPU may then control the multiplexer 266 to provide the first signal to the I input of the PIP processor 268 and the signal from the second source to the M input of the PIP processor 268. Finally, the CPU 208 may control the multiplexer 270 to send the second signal, provided by the multiplexer 264 to the display device 116.

A time between when the second content is displayed without an inset and when the second content is displayed in the first area and the first content is displayed in the inset area, or PIP is referred to as the "pre-set time." The term "predetermined duration" refers to the amount of time that both the second content and the first content are displayed in respective areas of the display device 116. The preset time and the preset duration may be the same or different.

After passage of a preset period of time (shown labeled as "Pre-set time"), the STB 110 presents the first content currently received on the first source in a second area of the display device 116 (at E). In the example implementation, the CPU 208 controls the multiplexer 270 to provide the signal produced by the PIP processor. The preset period of time may be 45 seconds, 1 minute, 1.5 minutes, 2 minutes, or some other period of time that may permit the advertising content to be no longer received from the first source.

Figure 3:
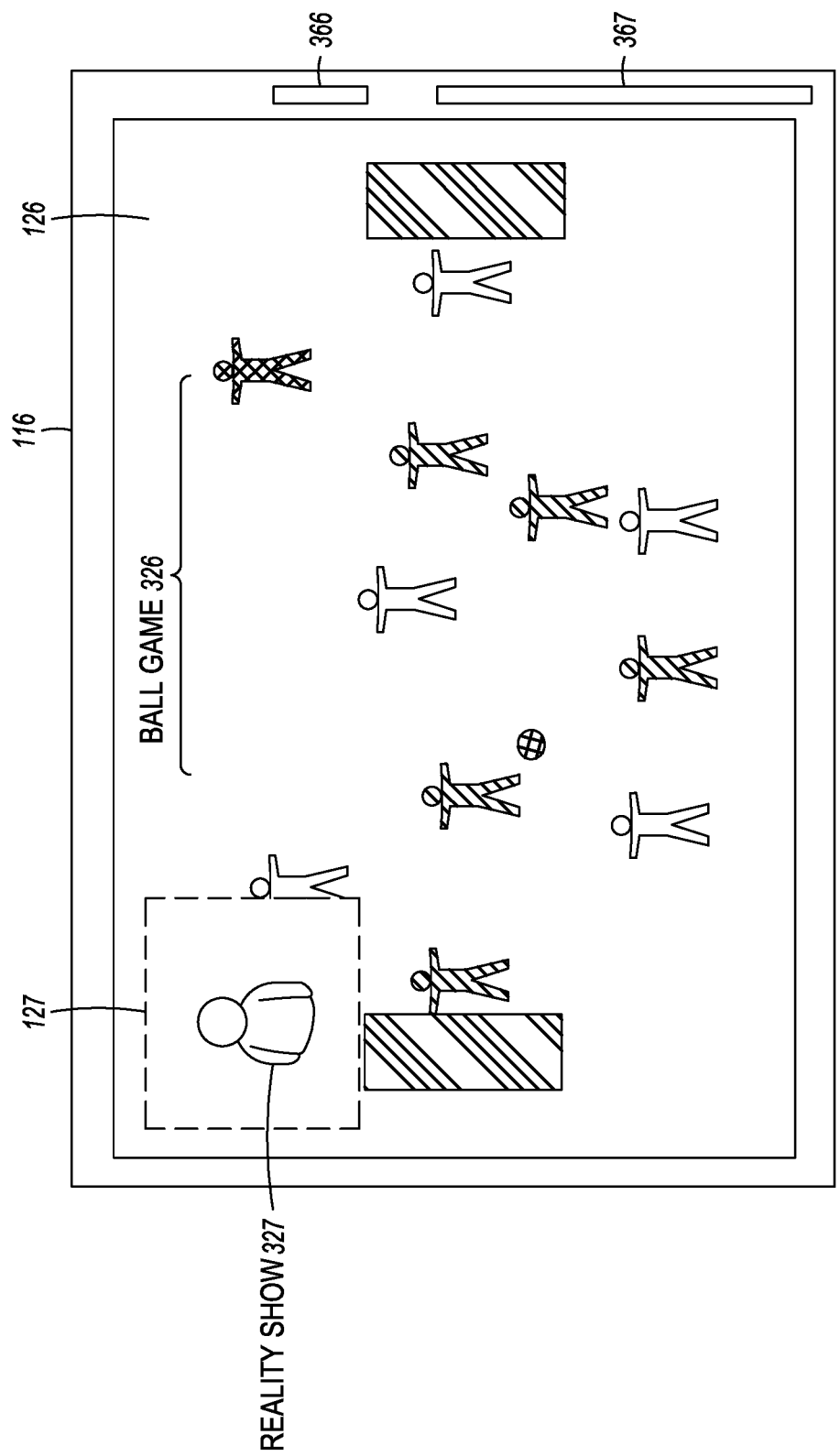
FIG. 3 illustrates an example of a display device presenting content as described in the examples of FIGS. 1A and 2.

It may be helpful at this time to briefly discuss FIG. 3 which illustrates an example of the first area and the second area. FIG. 3 illustrates an example of a display device 116 that is presenting first source content 327 (e.g., a reality show) in a second inset area 127 that overlaps less than all of the first area 126 of the display device 116 for concurrent presentation of the second content 326 (e.g., a ball game) and the first content 327 on the display device 116. Additional details of the display device 116 are described with reference to FIG. 3 below.

Returning back to the example of FIG. 2, step E, after a predetermined duration, such as 1, 3, 5, 10, 15 seconds or the like, of presenting the first content 327 in the second area 127, the process returns to set D. Returning to step D, the CPU 208 controls multiplexer 270 to again provide the content from multiplexer 264 and the first content 327 is no longer presented on the display device 116. As a result, at step D only the second content 326 is presented in the first area 126 (e.g., the full area) of the display device 116. As indicated by the arrow from E to D until receipt of a subsequent user input requesting return to the presentation of only the first content 327 in the first area 126 of the display device 116, the steps of presenting the content provided by multiplexer 264 (step D), and presenting in the content provided by the PIP processor 268 may be repeated.

At F, the user inputs a return request, which may or may not be the same input that generated the wait request, to the remote control device 232. For example, the viewer may actuate one of the buttons 233, 234 or 235, which is an input to the device 232 that is received by the CPU 208 via the user I/O 212. In response to receiving a subsequent user input requesting return to presentation of the first content 327 in the first area of the display, the CPU 208 controls the multiplexers 264 and 270 to provide the output of the video decoder 256 to the display device 116. For example, a viewer may decide to input the return request after the first content 327 currently being provided by the first source is programming content (e.g., the reality show programming) being presented in the second area (or portion) 127 of the display device 116 instead of advertising content, in which case, the STB 110 receiving the return input at the set top box. In some examples, the first area may refer to the entire, or full display area 126, while in other examples, the first area may be the entire display area 126 minus the inset area 127.

Although FIG. 1B shows the PIP function being implemented in the display device interface 202, it is contemplated that the display device 116 may include PIP functionality. This alternative example is illustrated in FIG. 3 which shows a display device presenting content as described in the examples of FIGS. 1A and 2. The display device 116 includes a controllable display 126 and a display input terminal 366, which receives video data from the multiplexers 264 and 266. The content from multiplexer 264 is the signal 326 from the second source while the content from multiplexer 266 is the signal 327 from the first source. Based on the received signals (as described above), a display control circuit 367 controls the display device 116 to present content received from one or more sources as is known in the display device arts.

Figure 4:
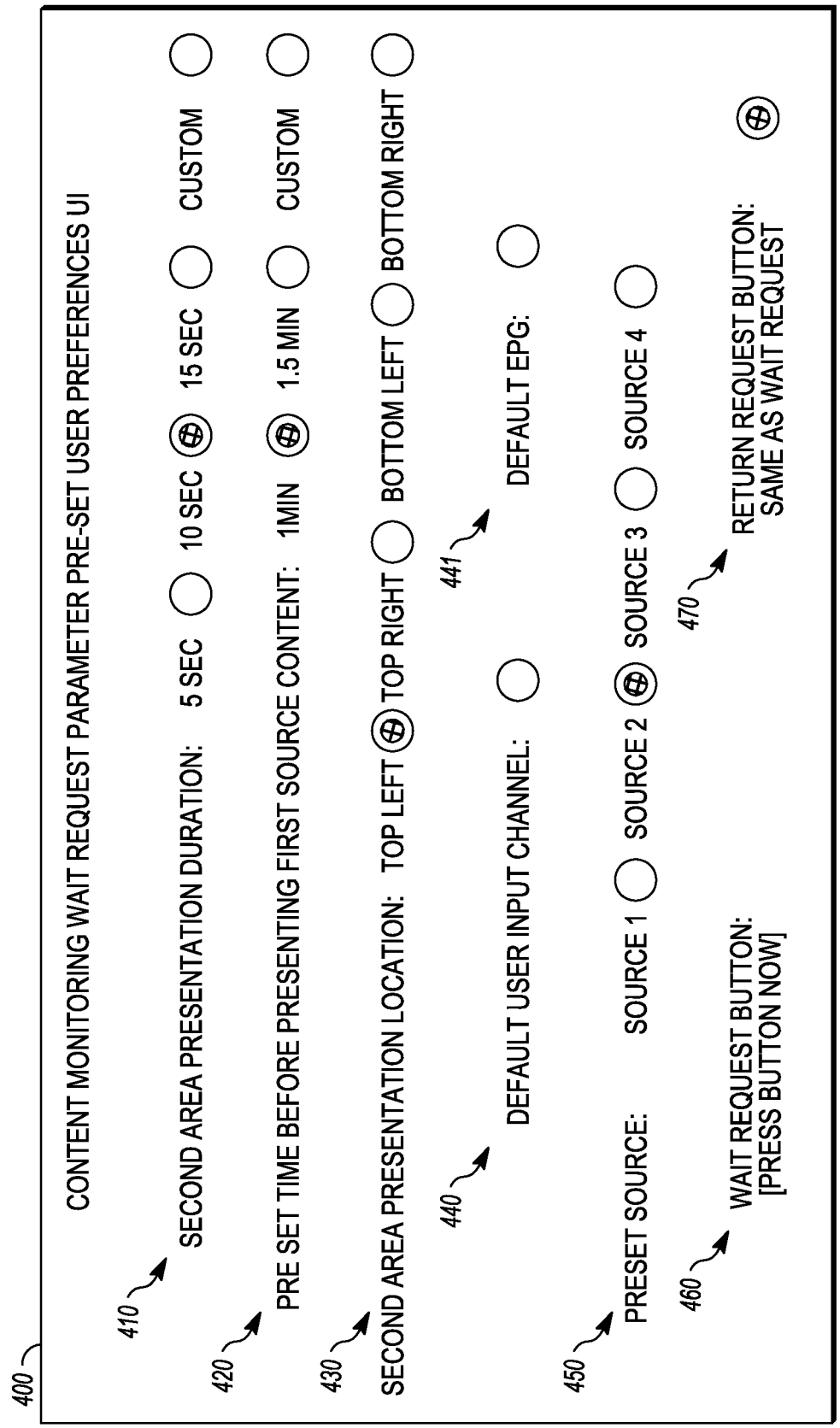
FIG. 4 illustrates an example of a user interface (UI) suitable for use in the content monitoring examples described herein.

In this implementation, the display device 116 includes a PIP processor that performs functions similar to those performed by the processor 268, described above, to present content output from the STB 110 that is received via the display terminal input 366. As discussed with reference to steps D and E of FIG. 2 above, the STB 110 outputs second content 326 from the second source for presentation on the display device 116. Periodically, the STB 110 may output for a predetermined duration first content 327 currently being provided by the first source. CPU 208 controls the display device to display the first content 327 from the second source in the portion 127 of the display device that is inset in the first area while displaying the second content 326 from the first source in the full display area 126 of the display device. The inset portion 127 overlaps less than all of the full display area 126 that is presenting the second content 326 from the second source FIG. 4 illustrates an example of a user interface (UI) suitable for use in the content monitoring examples described herein. For example, a UI 400 may be presented on the display device 116. The STB 110 may be configured to execute programming instructions that cause the generation of the UI 400. The STB 110 UI 400 may receive wait request parameter settings upon set up of the STB 110. The wait request parameters settings may include, for example, a duration 410, a pre-set period of time setting 420, a location setting 430, channel input or EPG default 440, a preset source 450, an assignment of the wait request button 460 and the return request button 470. The duration 410 is a preset that sets the period of time for which the first source's content currently being received by the set top box will be presented in the inset area of the display device. The pre-set period of time setting 420 determines the time interval until the presentation of the first source content in the second area is terminated. For example, after the pre-set period of time, the presentation of the first source content in the second area is terminated. As a result, only the second source content is presented in the first area without presentation of the first source's content in the inset area of the display device.

The location setting 430 enables a user to select a location within the full display area 126 that is to be overlapped by the presentation of the content currently being provided by the first source. At 440, the user may indicate that the default response to the selection of the wait request will be that the user will input a channel. Alternatively, the user may select to default to the electronic program guide (EPG) at 441. The user, at 460, may also assign which button on the remote control 232 by, for example, pressing the button when the NOW is highlighted, or some other manner of assigning the wait request function to a remote control 232 input may be provided. At 470, the user may indicate whether the same button used for the wait request will be used for the return request, or some other manner of assigning the return request function to a remote control 232 input may be provided. The STB 100 UI 400 may receive wait request parameter settings 410-470 prior to presentation of the first content. In an example, the wait request and return request may have a dedicated button, or respective buttons, on the remote control 232.

Figure 5:
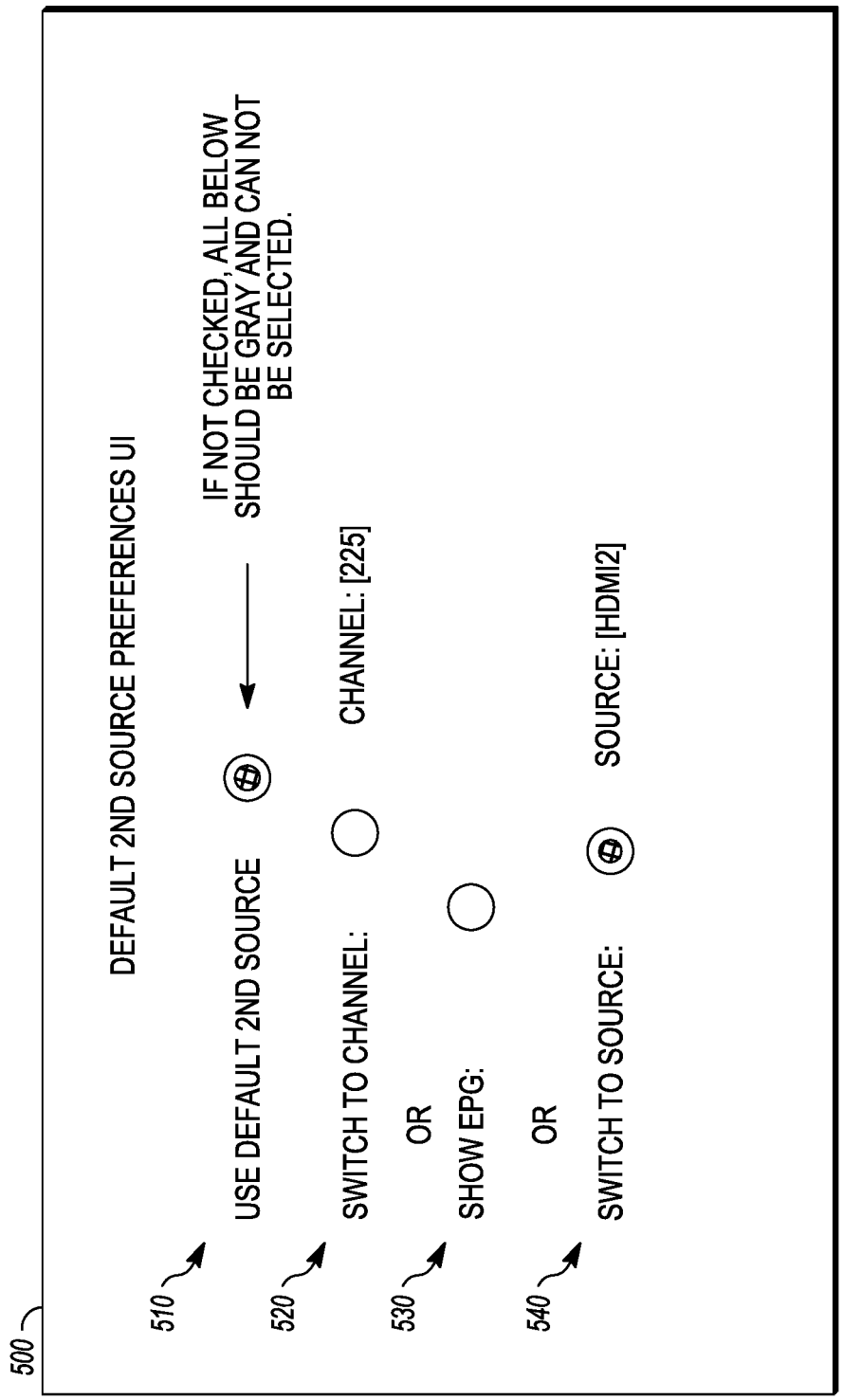
FIG. 5 illustrates a further example of a user interface (UI) suitable for use in the content monitoring examples described herein.

FIG. 5 illustrates a further example of a user interface (UI) suitable for use in the content monitoring examples that provides additional inputs of user preference data. The default second source preferences user interface (UI) 500 shows examples of additional or alternative user preference selections that a user may choose. For example, a user may choose to have a default second source, such as DVD/Digital Media 119 or another source 117 that is coupled to the HDMI2 input of the STB 110. If the "Use Default $2^{nd}$ Source" input indicator 510 is not selected, all other inputs may be unavailable. An unavailable input may be, for example, shown as "gray" or not shown at all in the UI 500.

However, when the "Use Default $2^{nd}$ Source" input indicator is selected, the user may select to have options to choose to have switch to a particular channel (at 520), such as the user's favorite channel, in this example, channel 225. Alternatively, the user can choose at 530 for the second source to default to presentation of the EPG. Should the EPG be selected as the default second source, the user may select as a content source another channel in the EPG for presentation. The selected channel will subsequently replace the EPG as the second source. As such, subsequent presentation of the second source content in the first area of the display will be the content on the selected channel. As yet another alternative, the user may choose at 540 another source, such a gaming console 117 or DVD 119, available on a source terminal of the STB 110.

Aspects of the methods of the exemplary apparatus and method outlined above may be embodied in programming, e.g. in the form of software, firmware, or microcode executable by a user computer system, a server computer or other programmable device. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the ESO 130 into the memory 210 of the STB 110. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to one or more of "non-transitory," "tangible" or "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-transitory storage media include, for example, optical or magnetic disks, such as any of the storage devices in any computer(s) or the like. It may also include storage media such as dynamic memory, for example, the main memory of a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and light-based data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Program instructions may comprise a software or firmware implementation encoded in any desired language. Programming instructions, when embodied in machine readable medium accessible to a processor of a computer system or device, render computer system or device into a special-purpose machine that is customized to perform the operations specified in the program.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical or similar elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A method, comprising:
   outputting first content chosen by a user received from a first source of a set top box for presentation in a first area of a display device;
   during presentation of the first content:
      receiving a user input of a wait request, the wait request including an identification of a second content chosen by the user to present on the display device; and
      presenting the second content in the first area of the display device in place of the first content;
   after passage of a preset period of time, presenting the first content concurrently with the second content wherein the first content is presented in a second area of the display device that overlaps less than all of the first area of the display device;
   after a predetermined duration of time of presenting the first content in the second area concurrently with the second content in the first area, terminating the presentation of the first content in the second area;
   until receipt of a subsequent user input, repeating the steps of:
      presenting in the second area of the display device the first content concurrently with presenting the second content in the first area of the display device;
      terminating the presentation of the first content in the second area of the display device after the predetermined duration; and
   in response to receiving a subsequent user input requesting return to presentation of the first content in the first area of the display device, presenting the first content in the first area of the display device.

2. The method of claim 1, further comprising:
   receiving, at the set top box, wait request parameter settings prior to presentation of the first content, wherein the wait request parameter settings include:
      the preset period of time for presenting only the second content in the first area without presentation of the first content in the second area of the display device, and
      the predetermined duration for presenting the first content currently with the second content.

3. The method of claim 1, wherein presenting the first content received from the first source of the set top box in the first area of the display device, comprises:
   presenting the first content in an entire area of a display of the display device, wherein the first area is the entire area of the display.

4. The method of claim 3, wherein presenting the first content in the second area of the display device comprises:
   presenting the first content in an area of the display of the display device that is an inset in the first area.

5. A system, comprising:
   a display device; and
   a set top box comprising:
      a memory for storing programming instructions and user related data;
      a wireless remote control device input interface for receiving inputs from a remote control device;
      a first content source for providing a user selected first content;
      a second content source for providing a user selected second content;
      an output terminal that outputs content to the display device; and
      a processor coupled to the memory, the wireless remote control device input interface, the first and second content sources, and the display device,
   wherein the processor when executing the programming instructions stored in the memory is configured to perform functions, including functions to:
      present the first content in a first area of the display device;
      during presentation of the first content:
      receive a user input of a wait request, the wait request including an identification of the second content source;
      present the second content in the first area of the display device in place of the first content;
      after passage of a preset period of time, present the first content in a second area of the display device, wherein the second area overlaps less than all of the first area of the display device for concurrent presentation of the second content and the first content on the display device:
      after a predetermined duration of time for presenting the first content in the second area, terminate presentation of the first content in the second area of the display device;
      until receipt of a subsequent user input, repeating the steps of:
         presenting in the second area of the display device the first content concurrently with presenting the second content in the first area of the display device;
         terminating the presentation of the first content in the second area of the display device after the predetermined duration; and
      in response to receiving a subsequent user input requesting a return to the presentation of the first content in the first area of the display device, present the first content in the first area of the display device.

6. The system of claim 5 wherein the second content source comprises at least a gaming device, a digital media device, a satellite communication device, or an Internet-connected device.

7. The system of claim 5, wherein the processor is further configured to:
   receive, at the set top box, wait request parameter settings prior to presentation of the first content, wherein the wait request parameter settings include:
      the preset period of time for presenting only the second content in the first area without presentation of the first content in the second area of the display device, and
      the predetermined duration for presenting the first content in the second area of the display device.

8. The system of claim 5, wherein when presenting the first content in the first area of the display device, the processor is further configured to:
present the first content in an entire area of a display of the display device.

9. The system of claim 8, wherein when presenting the second content in the second area of the display device, the processor is further configured to:
present the first content in an area of the display of the display device that is an inset in the first area.

10. The system of claim 5, further comprising:
a user remote control device, wherein the user remote control device comprises an input button configured to generate and transmit, when actuated, the wait request or the user input requesting the return to presentation of the first content in the first area of the display device.

11. A method, comprising:
outputting, from an output terminal of a set top box, a first content chosen by a user provided by a first source for presentation in a full display area of a display device;
receiving a wait request from a user input device;
in response to the received wait request, switching the set top box from outputting of the first content to outputting a second content chosen by the user from a second source;
while outputting the second content for presentation on the display device, periodically outputting for a predetermined duration of time the first content for presentation in a portion of the full display area of the display device that overlaps less than all of the full display area of the display device; and
in response to a return input from the user input device, switching the set top box from outputting of the second content to outputting the first content for presentation over the full display area of the display device;
wherein the periodically outputting for a predetermine duration of time the first content for presentation in a portion of the full display continues until receipt of the return input from the user input device.

12. The method of claim 11, comprising:
after receipt of the wait request, receiving an identification of the second source.

13. The method of claim 11, comprising:
receiving via a user interface of the set top box, a time period setting and a setting for the predetermined duration, wherein the time period setting determines an amount of time for which the second content is displayed before the first content is displayed in the portion of the full display area of the display device.

14. The method of claim 13, comprising:
receiving via the user interface of the set top box, a location within the full display area that is to be overlapped by the portion of the display device for presenting the first content.

15. A non-transitory machine-readable medium containing machine-readable programming instructions which, when executed by a processor, cause the processor to:
output, from an output terminal of a set top box, a first content chosen by a user, provided by a first source for presentation in a full display area of a display device;
receive a wait request via a user input device;
in response to the received wait request, switch the set top box from outputting of the first content to outputting a second content chosen by the user, from a second source;
while outputting the second content for presentation on the display device, periodically output for a predetermined duration of time the first content for presentation in a portion of the display device that overlaps less than all of the full display area of the display device; and
in response to a return input from the user input device, switch the set top box from outputting of the second content to outputting the first content for presentation over the full display area of the display device;
wherein the periodically outputting for a predetermine duration of time the first content for presentation in a portion of the full display continues until receipt of the return input from the user input device.

16. The non-transitory machine-readable medium containing machine-readable programming instructions of claim 15, wherein the first content includes:
advertising content presented sequentially with program content, and the wait request is received during presentation of the advertising content.

17. The non-transitory machine-readable medium containing machine-readable programming instructions of claim 15, comprising further instructions for causing the processor to:
receive, via a user interface of the set top box, a time period setting and a setting for the predetermined duration, wherein the time period setting determines an amount of time for which the second content is displayed before the first content is displayed in the portion of the full display area of the display device.

18. The non-transitory machine-readable medium containing machine-readable programming instructions of claim 17, comprising further instructions for causing the processor to:
receive, via the user interface of the set top box, a location within the full display area that is to be overlapped by the portion of the display device for presenting the first content.

* * * * *